(12) United States Patent
Wong

(10) Patent No.: US 6,976,420 B1
(45) Date of Patent: Dec. 20, 2005

(54) COOKING APPLIANCE

(75) Inventor: John Ying Man Wong, Shatin (HK)

(73) Assignee: Raymond Electric (China) Ltd., Shatin (HK)

( * ) Notice: Subject to any disclaimer, the term of this patent is extended or adjusted under 35 U.S.C. 154(b) by 0 days.

(21) Appl. No.: 10/768,162

(22) Filed: Feb. 2, 2004

Related U.S. Application Data

(63) Continuation-in-part of application No. 10/434,066, filed on May 9, 2003.

(51) Int. Cl.[7] .............................................. A47J 37/12
(52) U.S. Cl. ........................................ 99/409; 99/348
(58) Field of Search ................... 99/330–336, 403–417, 99/348, 427, 444–450; 210/167, DIG. 8; 126/391.1, 389.1; 366/241, 332, 255, 256; 426/438, 441, 510, 511, 520, 523

(56) References Cited

U.S. PATENT DOCUMENTS

| | | | |
|---|---|---|---|
| 483,721 A | 10/1892 | Hulbert | |
| 1,749,527 A | 3/1930 | Cook | |
| 2,101,841 A | 12/1937 | Dinley | |
| 3,017,758 A | 1/1962 | Haverstock | |
| 4,264,741 A | 4/1981 | Friedman et al. | |
| 4,873,920 A * | 10/1989 | Yang | 99/409 |
| 4,901,633 A | 2/1990 | De Longhi | |
| 5,010,805 A * | 4/1991 | Ferrara | 99/353 |
| 5,027,697 A | 7/1991 | De Longhi | |
| 5,379,684 A | 1/1995 | Ettridge | |
| 5,543,166 A * | 8/1996 | Masel et al. | 426/523 |
| 5,611,265 A | 3/1997 | Ronci et al. | |
| 5,771,781 A | 6/1998 | Sham | |
| 6,077,555 A | 6/2000 | Dotan | |
| 6,305,270 B1 | 10/2001 | Wang | |
| 6,523,457 B1 * | 2/2003 | Ancona et al. | 99/330 |
| 6,679,163 B1 * | 1/2004 | Su | 99/341 |
| 6,708,603 B1 * | 3/2004 | Li-Chen | 99/409 |
| 2004/0221725 A1 | 11/2004 | Wong | |

FOREIGN PATENT DOCUMENTS

FR        2 328 436        5/1977

* cited by examiner

Primary Examiner—Timothy F. Simone
(74) Attorney, Agent, or Firm—Leydig, Voit & Mayer, Ltd.

(57) ABSTRACT

A cooking appliance includes a container for containing a cooking liquid; an electrical heating element for heating cooking liquid in the container; a perforated food receptacle comprising first and second adjacent baskets supported in the container for unitary rotation about a substantially horizontal axis, the baskets being openable from a closed food-containing configuration in which part of the receptacle passes through the cooking liquid in the container upon rotation of the receptacle, to enable insertion and removal of food pieces; and a drive mechanism for rotating the food receptacle about the axis.

18 Claims, 5 Drawing Sheets

COOKING APPLIANCE

This application is a CIP of Ser. No. 10/434,066, filed May 9, 2003, pending.

The present invention relates to a cooking appliance that is used particularly but not exclusively for frying food.

BACKGROUND OF THE INVENTION

Cooking appliances of the type concerned in general are known, for example as disclosed in U.S. Pat. No. 6,077,555, in which a puddle frame is pivoted about a horizontal axis in a stationary food basket submerged partially in cooking oil for agitating food articles in the basket. The frame inevitably breaks or squashes the food articles. In another known cooking appliance, there is used a cylindrical basket that is rotated centrally about a vertical axis to agitate the food articles contained therein, but a relatively large amount of cooking oil is needed and the food articles cannot be agitated sufficiently thoroughly.

The subject invention seeks to mitigate or at least alleviate such problems by providing an improved cooking appliance.

SUMMARY OF THE INVENTION

According to the invention, there is provided a cooking appliance comprising:
  a container for containing a cooking liquid;
  an electrical heating element for heating cooking liquid in the container;
  a perforated food receptacle comprising first and second adjacent baskets supported in the container for unitary rotation about a substantially horizontal axis, the baskets being openable from a closed food-containing configuration in which part of the receptacle passes through the cooking liquid in the container upon rotation of the receptacle, to enable insertion and removal of food pieces; and
  a drive mechanism for rotating the food receptacle about the axis.

Preferably, both baskets are perforated.

Preferably, the appliance further comprises a base in which the container is housed, and a lid attached hingedly to the base and wherein one of the baskets is attached to the lid and lifts away from the other basket when the lid is opened.

Preferably, one of the baskets includes a wall extending at least partially around the axis, the wall including a plurality of traps for trapping and carrying the food articles out of the cooking liquid upon rotation of the receptacle and then allowing the food articles to fall back down upon further rotation of the receptacle.

Preferably, one of the baskets has a drainage wall that is spaced sufficiently close to the axis so as not to be immersed in the cooking liquid at a selected angular/drainage orientation of the food receptacle.

Preferably, the container has a cross-section that is larger than that of the food receptacle, together sharing a common central axis.

Preferably, the food receptacle is partly cylindrical and has a central axis coinciding with the rotation axis.

Preferably, the traps are spaced apart angularly about the pivot axis.

Preferably, the traps comprise protrusions on an inner surface of the baskets.

More preferably, the receptacle baskets are substantially hemi-cylindrical about the axis and have opposite ends, across which ends at least some of the protrusions extend.

Further more preferably, some or all of the protrusions have generally curved profiles.

Preferably, the food receptacle has a generally cylindrical shape about the axis, and the drive mechanism is adapted to rotate the food receptacle in a continuous manner.

It is preferred that the drive mechanism comprises an electric motor and a gearbox transmitting output from the motor to an output coupling.

It is further preferred that the baskets comprise input coupling parts that interengage with one another and engage with the output coupling upon closure of the lid.

Preferably, the input coupling comprises a first coupling part affixed to the upper basket and a second coupling part affixed to the lower basket, the first and second coupling parts slotting together to secure the upper and lower baskets in a food-containment configuration.

It is preferred that the appliance further comprises a handle supported pivotally by the base and attached rotationally with respect to said other basket and adapted to lift the other basket away from the container when desired.

It is further preferred that there is provided at a proximal end of the handle a cam surface engaging with a locking pin that locks the handle to serve other basket when the handle is raised.

Preferably, the container comprises a trough into which the cooking liquid is received.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figures 2, 3:
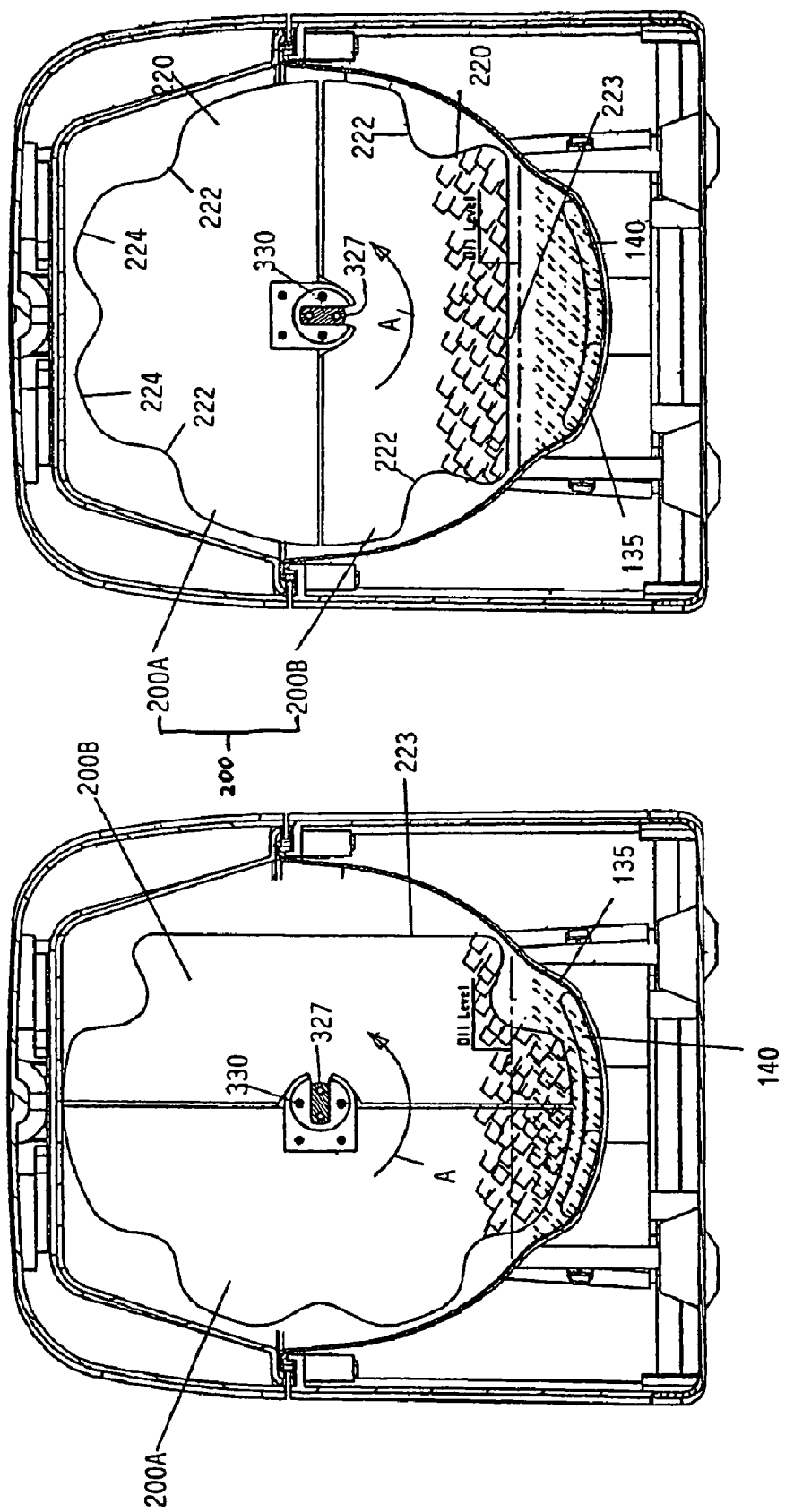
FIG. 2 is a schematic cross-sectional end elevation of the cooking appliances of FIG. 1 in an operational mode in which food items are submerged in heated cooking oil.
FIG. 3 is a schematic cross-sectional end elevation of the cooking appliance of the FIG. 2, in which the food items are located above the cooking oil during rotation or draining of its cooking baskets.
Figure 4:
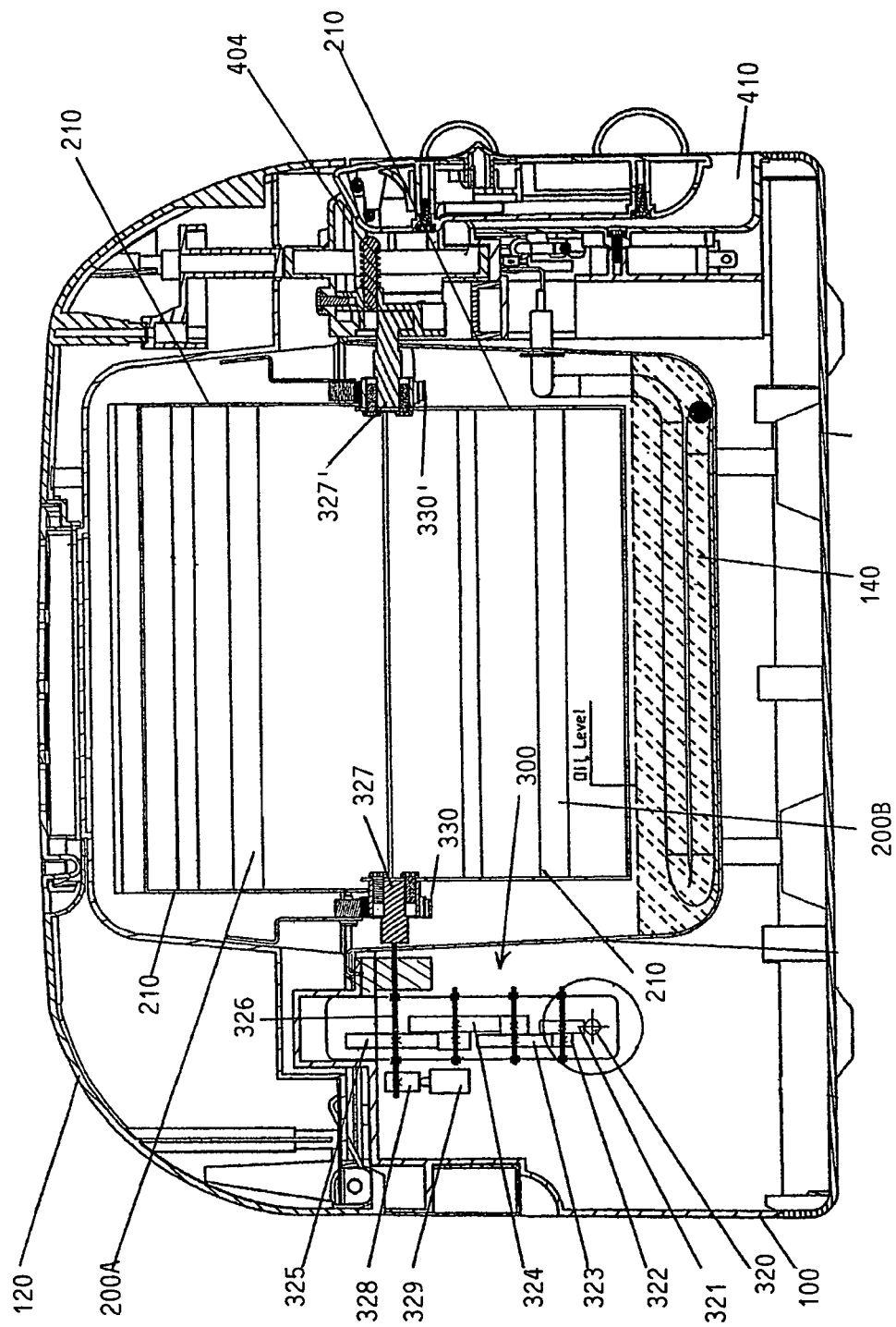
FIG. 4 is a schematic cross-sectional side elevation of the cooking appliance of FIG. 1, with its lid closed.

Referring to the drawings, there is shown schematically a cooking appliance 10 embodying the invention, which comprises a rectangular box-like housing 100, a generally cylindrical stainless steel food receptacle 200 comprising an upper basket 200A and a lower basket 200B that are rotatable about a horizontal central axis as indicated generally by the arrows A in FIGS. 2 and 3. There is also a drive mechanism 300 for rotating the receptacle 200. The housing 100 has a main body 110 housing the food receptacle 200 and the driving mechanism 300, and includes a hollow top lid 120 hinged at one end for closing the body 110.

Also housed within the body 110 is a generally deep semi-cylindrical fixed aluminium or stainless-steel pot 130 having a bottom trough 135 into which cooking oil is received. The pot 130 has a rectangular top opening. The food receptacle 200 lies horizontally inside the pot 130, together sharing a common horizontal central axis that coincides with the rotational axis of the upper and lower baskets. The drive mechanism 300 is located outside the pot 130, at one end thereof.

The food receptacle upper and lower baskets 200A and 200B are screen baskets, each having a pair of generally semi-circular solid vertical end walls 210 and generally shallow hemi-cylindrical meshed or perforated base walls 220. The base walls 220 extend horizontally at right angles across the end walls 210 and around or about the rotational axis.

The drive mechanism 300 incorporates an electric motor 310 driving a horizontal output worm gear 320 that is in mesh with a worm wheel 321 having a pinion 322 which drives an upward train of two double gearwheels 323 and 324 for speed reduction. The upper double gearwheel 324 drives a gear 325 fixed on a horizontal shaft 326 that has an output coupling (not shown) that engages with a first input coupling part 327 having a non-circular cross-section—typically substantially rectangular. The first input coupling part 327 is fixed by screws to an adjacent end wall 210 of the lower basket 200B at a position coinciding with the rotation axis.

The upper basket 200A includes a second input coupling part 330 fixed by screws to an end wall 210 thereof. The second input coupling part 330 has a slot into which the first input coupling part 327 is received to mutually connect the first and second input coupling parts 327 and 330. When the first input coupling part 327 rotates as a result of it being coupled with the shaft 326, the baskets 200A and 200B both rotate in unison. Attached to the opposite end of the shaft 326 is a cam 328 that activates a micro-switch 329 associated with a control circuitry (not shown) to ensure that the receptacle 200 will always stop rotation at an orientation with its lower basket 200B symmetrically lowermost (see FIGS. 1 and 3).

There is a similar pair of coupling parts 327' and 330' at the other end of the lower and upper baskets 200B and 200A, but they are only provided for coupling the two baskets together at said other end for simultaneous rotation. The coupling part 327' is associated with a handle 400 by which the lower basket 200B can be withdrawn from the pot 130. The handle 400 is attached to the lower basket 200B by a pivot pin 401 behind a heat insulating disk 402. There is a cam surface 403 at the proximal end of the handle 400, which bears against a spring-loaded locking pin 404 when it is vividly raised. The locking pin 404 then projects into a hole 405 fixed in relation to the lower basket 200B so that the basket 200B can be lifted out of the pot 130 together with the heat insulating disk 402, without the basket 200B rocking back and forth about the handle 400. While staying inside the pot 130, with the handle 400 being folded down into a vertical side recess 410 of the housing 100 thereby allowing the pin 404 to retract, the lower basket 200B is free to rotate with the upper basket 200A by the drive mechanism 300.

Figure 5:
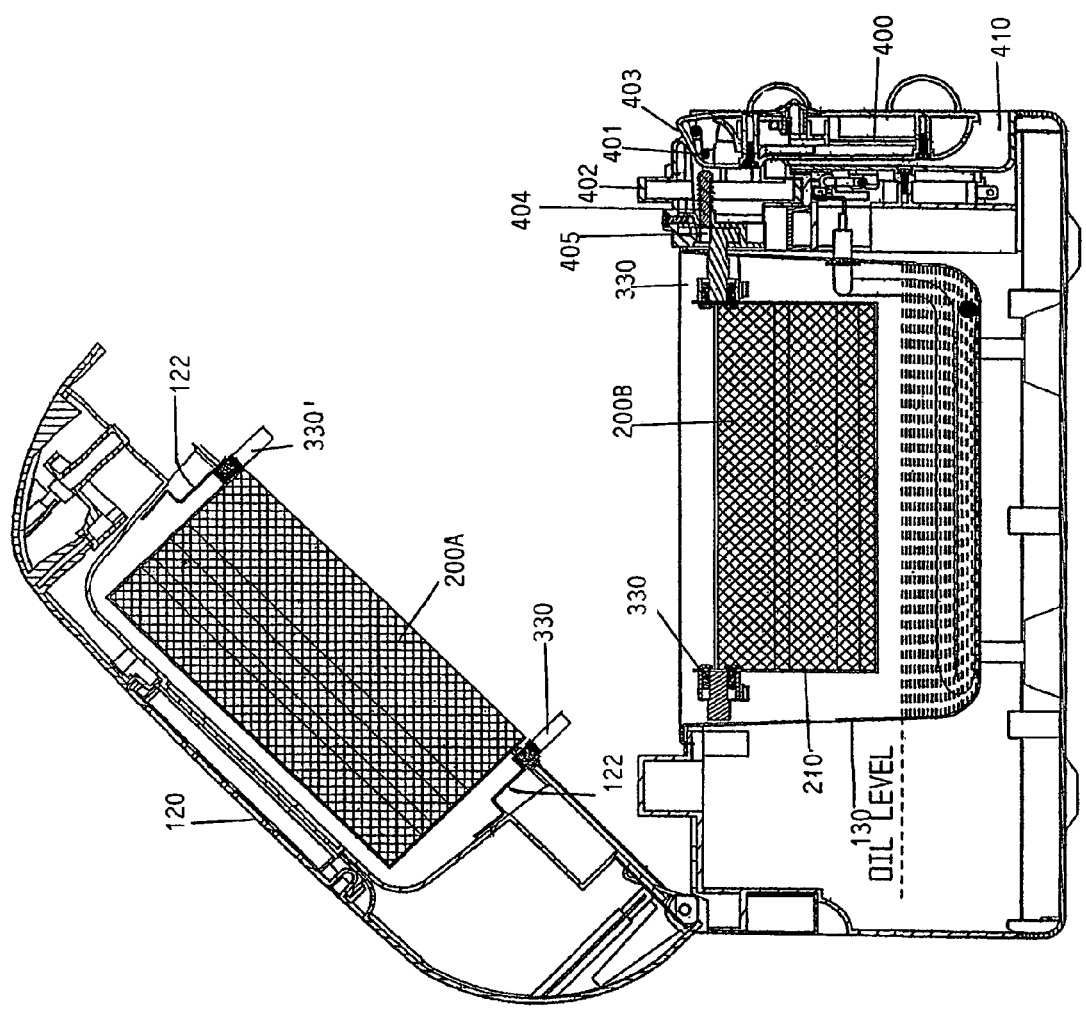
FIG. 5 is a schematic cross-sectional side elevation of the cooking appliance of FIG. 1, with its lid open.
Figure 6:
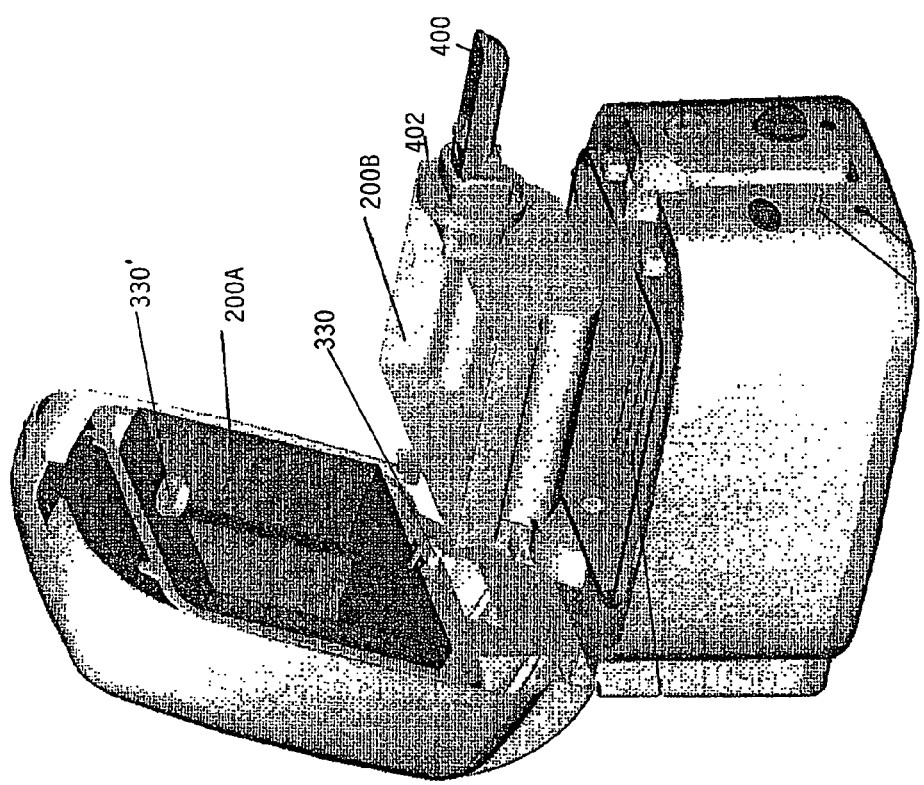
FIG. 6 is a schematic perspective illustration of the cooking appliance of the preceding figures, with its lid open and its handle raised during removal of one of the cooking baskets.

The lid 120 is hollow to accommodate the upper basket 200A and includes a pair of opposed spring-loaded holders 122 for engaging and thus holding the upper basket 200A by its coupling parts 330 and 330' within the lid 120 when the lid 120 is lifted open. Thus, upon opening of the lid 120, the receptacle 200 is simultaneously opened, as shown in FIG. 5.

The trough 135 serves to contain a relatively small amount (say 375 ml) of cooking liquid, such as edible oil, that submerges the lowermost space (as shown by dotted lines in FIG. 1) of the food baskets 200A and 200B at almost any angular position thereof. An electrical heater 140 is installed right at the bottom of the trough 135 to heat up the oil (say to 200° C.) for cooking say potato chips.

The baskets 200A and 200B include, on their inner surfaces of their base walls 220, a plurality of food traps formed by ridges 222 each having a curved profile. Ridges 222 are spaced apart angularly about the pivot axis. As part of the base wall 220, the ridges 222 are likewise meshed or perforated. The ridges 222 are relatively short (in terms of height) and are separated to form co-parallel shallow recesses or channels 224 between them for temporarily trapping or retaining the potato chips.

Figure 1:
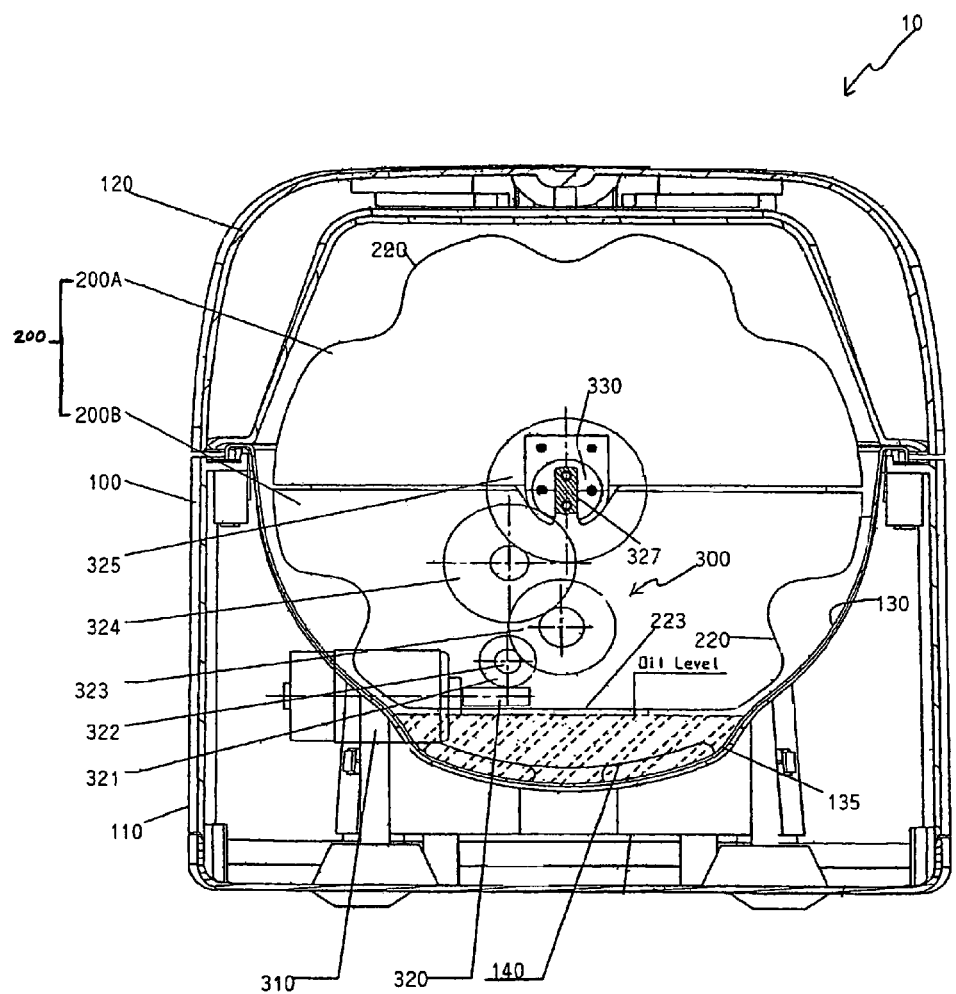
FIG. 1 is a schematic cross-sectional end elevation of an embodiment of a cooking appliance in accordance with the invention, said appliance being shown closed.

There is a flat portion 223 in the base wall 220 of the lower basket 200B. This flat portion 223 stays above the level of oil in the trough 135 when the basket 200B is in the lowermost orientation, as depicted in FIGS. 1 and 3. As with the remainder of the base wall 220, the flat portion 223 is perforated to enable draining of oil from the chips, should the baskets 200A and 200B not be rotating at the end of cooking.

During rotation of the food baskets 200A and 200B, the potato chips are conveyed upwards on the rising side of the basket wall 220. The chips at the top of the heap will gradually roll or slide (or fall) back down, while those at the bottom remain trapped in the channels 224 as retained by the ridges 222. When the baskets 200A and 200B continue to rotate, most of those bottom chips previously entrapped will have been conveyed upward and then allowed to roll back down thereby becoming situated at the top of the heap. Thus, the chips at the bottom being fried in the oil) are turned upwards to the top (out of the oil). The rotation continues until all the potato chips are cooked.

The ridges 222 are made not too tall to ensure that all the potato chips that have been lifted can go back down. All the ridges 222, especially those upper ones on either side, have a generally curved profile having opposite sides.

The traps, i.e. ridges 222 and channels 224, are produced by bending the base wall 220 of each basket in a wavy manner. In a different construction, the traps might be provided by any other forms of protrusions, such as knobs, bosses or posts, fixed on the basket base wall 220, which are spaced apart to create cavities therebetween for trapping or catching food articles.

The food articles are to be turned and mixed by themselves without the use of any agitator so that they can remain intact without being broken into smaller pieces or squashed. Given that the food articles will be turned continuously, a relatively small amount of cooking liquid can be used, which by reason of its small quantity can be heated up to the required cooking temperature (200° C.) in a relatively short time (say 5 minutes).

The invention has been given by way of example only, and various other modifications and/or variations to the described embodiments may be made by persons skilled in the art without departing from the scope of the invention as specified in the accompanying claims.

What is claimed is:

1. A cooking appliance comprising:
   a container for containing a cooking liquid;
   an electrical heating element for heating cooking liquid in the container;
   a perforated food receptacle comprising first and second adjacent baskets supported in the container for unitary rotation about a substantially horizontal axis, the baskets being openable from a closed food-containing configuration in which part of the receptacle passes through the cooking liquid in the container upon rotation of the receptacle, to enable insertion and removal of food pieces; and a drive mechanism for rotating the food receptacle about the axis.

2. The cooking appliance of claim 1 wherein both baskets are perforated.

3. The cooking appliance of claim 1, further comprising a base in which the container is housed, and a lid attached hingedly to the base and wherein one of the baskets is attached to the lid and lifts away from the other basket when the lid is opened.

4. The cooking appliance of claim 1 wherein one of the baskets includes a wall extending at least partially around the axis, the wall including a plurality of traps for trapping and carrying the food articles out of the cooking liquid upon rotation of the receptacle and then allowing the food articles to fall back down upon further rotation of the receptacle.

5. The cooking appliance of claim 1, wherein one of the baskets has a drainage wall that is spaced sufficiently close to the axis so as not to be immersed in the cooking liquid at a selected angular/drainage orientation of the food receptacle.

6. The cooking appliance of claim 1, wherein the container has a cross-section that is larger than that of the food receptacle, together sharing a common central axis.

7. The cooking appliance of claim 1, wherein the food receptacle is partly cylindrical and has a central axis coinciding with the rotation axis.

8. The cooking appliance of claim 4, wherein the traps are spaced apart angularly about the pivot axis.

9. The cooking appliance of claim 4, wherein the traps comprise protrusions on an inner surface of the baskets.

10. The cooking appliance of claim 9, wherein the receptacle baskets are substantially hemi-cylindrical about the axis and have opposite ends, across which ends at least some of the protrusions extend.

11. The cooking appliance of claim 10, wherein some or all of the protrusions have generally curved profiles.

12. The cooking appliance of claim 1, wherein the food receptacle has a generally cylindrical shape about the axis, and the drive mechanism is adapted to rotate the food receptacle in a continuous manner.

13. The cooking appliance of claim 3, wherein the drive mechanism comprises an electric motor and a gearbox transmitting output from the motor to an input coupling.

14. The cooking appliance of claim 13, wherein the baskets comprise input coupling parts that interengage with one another and engage with the output coupling upon closure of the lid.

15. The cooking appliance of claim 13 wherein the input coupling comprises a first coupling part affixed to the upper basket and a second coupling part affixed to the lower basket, the first and second coupling parts slotting together to secure the upper and lower baskets in a food-containment configuration.

16. The cooking appliance of claim 3, further comprising a handle supported pivotally by the base and attached rotationally with respect to said other basket and adapted to lift the other basket away from the container when desired.

17. The cooking appliance of claim 16, wherein there is provided at a proximal end of the handle a cam surface engaging with a locking pin that locks the handle to serve other basket when the handle is raised.

18. The cooking appliance of claim, 1 wherein the container comprises a trough into which the cooking liquid is received.

* * * * *